US011014456B2

(12) United States Patent
Lee et al.

(10) Patent No.: US 11,014,456 B2
(45) Date of Patent: May 25, 2021

(54) SYSTEM AND METHOD FOR REDUCING ACCELERATION SHOCK OF ELECTRIC MOTOR VEHICLE

(71) Applicants: Hyundai Motor Company, Seoul (KR); Kia Motors Corporation, Seoul (KR)

(72) Inventors: Hee Jin Lee, Seoul (KR); Hyo Jun Kwak, Busan (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 31 days.

(21) Appl. No.: 16/660,396

(22) Filed: Oct. 22, 2019

(65) Prior Publication Data

US 2020/0391598 A1    Dec. 17, 2020

(30) Foreign Application Priority Data

Jun. 13, 2019    (KR) .................. 10-2019-0069705

(51) Int. Cl.
*H02P 6/08*    (2016.01)
*B60L 15/20*    (2006.01)

(52) U.S. Cl.
CPC ............ *B60L 15/2072* (2013.01); *H02P 6/08* (2013.01); *B60L 2240/14* (2013.01); *B60L 2240/421* (2013.01); *B60L 2240/423* (2013.01); *B60L 2270/00* (2013.01)

(58) Field of Classification Search
CPC ............... B60L 2240/423; B60L 15/20; B60L 15/2072; H02P 6/08
See application file for complete search history.

(56) References Cited

U.S. PATENT DOCUMENTS

| 8,892,281 | B2* | 11/2014 | Suzuki .................... B60L 15/20 701/22 |
| 8,932,182 | B2* | 1/2015 | Tatewaki ............. B60W 10/115 477/135 |
| 9,327,707 | B2* | 5/2016 | Hawkins ................ B60W 20/15 |
| 9,493,148 | B2* | 11/2016 | Nefcy ................... F16H 63/502 |
| 10,017,173 | B2* | 7/2018 | Kim ....................... B60W 20/13 |

\* cited by examiner

*Primary Examiner* — Thai T Dinh
(74) *Attorney, Agent, or Firm* — Mintz Levin Cohn Ferris Glovsky and Popeo, P.C.; Peter F. Corless

(57) ABSTRACT

A system and a method for reducing the acceleration shock of an electric motor vehicle are provided. A backlash torque range is determined based on a coast down value indicating the motor torque for maintaining a vehicle speed. A slope of the motor torque that falls within a backlash torque range is reduced and corrected, considering that the motor torque for causing backlash is changed as the motor speed changes, thereby reducing the shock due to the backlash at the acceleration (start-up) of a vehicle.

15 Claims, 3 Drawing Sheets

SYSTEM AND METHOD FOR REDUCING ACCELERATION SHOCK OF ELECTRIC MOTOR VEHICLE

CROSS-REFERENCE TO RELATED APPLICATION

This application claims under 35 U.S.C. § 119(a) the benefit of priority to Korean Patent Application No. 10-2019-0069705 filed on Jun. 13, 2019, the entire contents of which are incorporated herein by reference.

BACKGROUND

(a) Technical Field

The present disclosure relates to a system and a method for reducing the acceleration shock of an electric motor vehicle, and more particularly, to a system and a method for reducing the acceleration shock of an electric motor vehicle capable of reducing the shock due to backlash during the acceleration of a vehicle.

(b) Background Art

As well known, a hybrid vehicle, an electric vehicle, a hydrogen fuel cell vehicle, etc. are operated by driving an electric motor, which is a power source. The electric motor-driven vehicle is equipped with a regenerative braking system for battery charging and braking assistance unlike the conventional internal combustion engine vehicle. The regenerative braking is a function of charging the battery using the counter electromotive force of the electric motor, and for example, when a wheel and a drive shaft rotate the motor when the driver has disengaged an accelerator pedal, the motor operates as a generator to charge a battery.

At this time, when the driver engages the accelerator pedal again to accelerate or start-up, the motor is driven by a control signal of a motor controller, and the wheel and the drive shaft are driven by the motor driving to perform the acceleration traveling. More specifically, a speed reducer combined with a plurality of gears is mounted on the output shaft of the motor, and the power of the motor is output to the drive shaft through the speed reducer, to drive the drive shaft and the wheel to perform the acceleration traveling.

Meanwhile, backlash inevitably occurs in the gear, etc. in the speed reducer in the transition section converting from the motor driving state for regenerative braking into the motor driving state for acceleration traveling, thereby occurring the shock at the acceleration traveling (at the start-up). Therefore, to reduce the backlash occurred in the transition section between the regenerative braking and the acceleration and the shock thereby, a method for setting the motor torque applied to the motor to, for example, a backlash torque range between +10 Nm and −10 Nm based on 0 Nm, and smoothly applying the slope of the set torque to mitigate the shock caused by the backlash.

Nevertheless, side effects such as a delay in the start-up of the vehicle and a reduction in acceleration are accompanied, and in addition, t the shock at the acceleration is still present by insufficiently reflecting the fact that the motor torque is applied beyond the backlash torque range, etc. according to the vehicle speed.

The above information disclosed in this unit is merely for enhancement of understanding of the background of the disclosure and therefore it can contain information that does not form the prior art that is already known in this country to a person of ordinary skill in the art.

SUMMARY

The present disclosure provides a system and a method for reducing the acceleration shock of an electric motor vehicle, which may determine the backlash torque range based on a coast down value indicating the motor torque for maintaining the vehicle speed, and reduce and correct the slope of the motor torque belonging to the backlash torque range, considering that backlash occurs around 0 Nm of the motor torque but as the motor speed changes, the motor torque for causing the backlash is changed, thereby reducing the shock due to the backlash at the acceleration (start-up) of a vehicle.

An exemplary embodiment of the present disclosure for achieving the object provides a system for reducing the acceleration shock of an electric motor vehicle that may include a motor controller configured to execute the motor driving of an electric motor vehicle, and perform shock reduction logic due to backlash at the acceleration using vehicle acceleration, motor torque, and motor speed information, and that may include a backlash torque determination unit configured to determine a backlash torque range based on a coast down value; a motor torque controller configured to correct the slope of the motor torque by determining whether current motor torque and motor RPM fall within the backlash torque range determined in the backlash torque determination unit; and a backlash shock determination unit configured to determine whether the maximum value of the vehicle acceleration occurs within the backlash torque range determined in the backlash torque determination unit.

In an exemplary embodiment of the present disclosure, the motor controller may further include a backlash torque correction unit configured to correct the coast down value when the maximum value of the vehicle acceleration is outside of the backlash torque range determined in the backlash torque determination unit. In addition, the backlash torque determination unit may be configured to determine the backlash torque range based on the coast down value defined as the motor torque for maintaining a specific motor speed.

The motor torque controller may be configured to determine whether current motor torque for maintaining the motor speed falls within the backlash torque range determined in the backlash torque determination unit, based on the current motor torque and the motor speed. The motor torque controller may be configured to further reduce the slope of the motor torque applied to the motor than a predetermined slope, when the current motor torque for maintaining the motor speed falls within the backlash torque range determined in the backlash torque determination unit.

Additionally, the motor torque controller may be configured to apply the slope of the motor torque applied to the motor at a predetermined motor torque slope, when the current motor torque for maintaining the motor speed is outside the backlash torque range determined in the backlash torque determination unit. In an exemplary embodiment of the present disclosure, the backlash shock determination unit may be configured to determine whether the maximum (MAX) acceleration of the vehicle has occurred in the backlash torque range determined in the backlash torque determination unit by receiving the vehicle acceleration information. The backlash shock determination unit may be configured to perform the correction of further reducing the motor torque slope secondarily, when the difference between the maximum (MAX) acceleration and the minimum (MIN) acceleration of the vehicle is greater than a threshold.

Further, the backlash torque correction unit may be configured to determine whether the motor torque that is outside the backlash torque range is greater than or less than the backlash torque range, and then may be configured to reduce and correct the coast down value when the motor torque that is outside of the backlash torque range is less than the lower limit value of the backlash torque range, and to increase and correct the coast down value when the motor torque that is outside of the backlash torque range is greater than the upper limit value of the backlash torque range.

Another exemplary embodiment of the present for achieving the object provides a method for reducing the acceleration shock of an electric motor vehicle that may include determining, in a backlash torque determination unit, a backlash torque range based on a coast down value defined as the motor torque for maintaining a specific vehicle speed; correcting the slope of the motor torque by determining, in a motor torque controller, whether current motor torque and motor speed fall within the backlash torque range determined in the backlash torque determination unit; and determining, in a backlash shock determination unit, whether the maximum value of the vehicle acceleration occurs in the backlash torque range determined in the backlash torque determination unit.

Another exemplary embodiment of the present disclosure may further include correcting the coast down value in a backlash torque correction unit, when the maximum value of the vehicle acceleration is outside of the backlash torque range determined in the backlash torque determination unit. In addition, the motor torque controller may be configured to further reduce the slope of the motor torque applied to a motor than a predetermined slope, when current motor torque and motor speed fall within the backlash torque range determined in the backlash torque determination unit.

Conversely, the motor torque controller may be configured to apply the motor torque at a predetermined motor torque slope, when the current motor torque and the motor speed are outside of the backlash torque range determined by the backlash torque determination unit. The backlash shock determination unit may be configured to execute the correction of further reducing the slope of the motor torque secondarily, when the difference between the maximum (MAX) acceleration and the minimum (MIN) acceleration of the vehicle is greater than a threshold.

Particularly, the correcting of the coast down value may include determining whether the motor torque that is outside of the backlash torque range is greater than or less than the backlash torque range; reducing and correcting the coast down value when the motor torque that is outside of the backlash torque range is less than the lower limit value of the backlash torque range; and increasing and correcting the coast down value when the motor torque that is outside of the backlash torque range is greater than the upper limit value of the backlash torque range.

The present disclosure provides the following effects through the above configuration.

Firstly, it may be possible to determine the backlash torque range based on a coast down value indicating the motor torque for maintaining the vehicle speed, and reduce and correct the slope of the motor torque belonging to the backlash torque range, considering that as the motor speed changes, the motor torque for causing the backlash is changed, thereby reducing the shock due to the backlash at the acceleration (start-up) of a vehicle.

Secondly, the backlash torque range may be determined using the coast down value for maintaining the specific motor speed, and it may be possible to change the determined backlash torque by the learning according to the vehicle weight and traveling pattern, such that it may be possible to more accurately determine the backlash torque range, and reduce and correct the slope of the motor torque belonging to the determined backlash torque range, thereby more easily reducing the shock due to the backlash at the acceleration (start-up) of the vehicle.

BRIEF DESCRIPTION OF THE DRAWINGS

The above and other features of the present disclosure will now be described in detail with reference to exemplary embodiments thereof illustrated the accompanying drawings which are given herein below by way of illustration only, and thus are not limitative of the present disclosure, and wherein.

Figure 1:
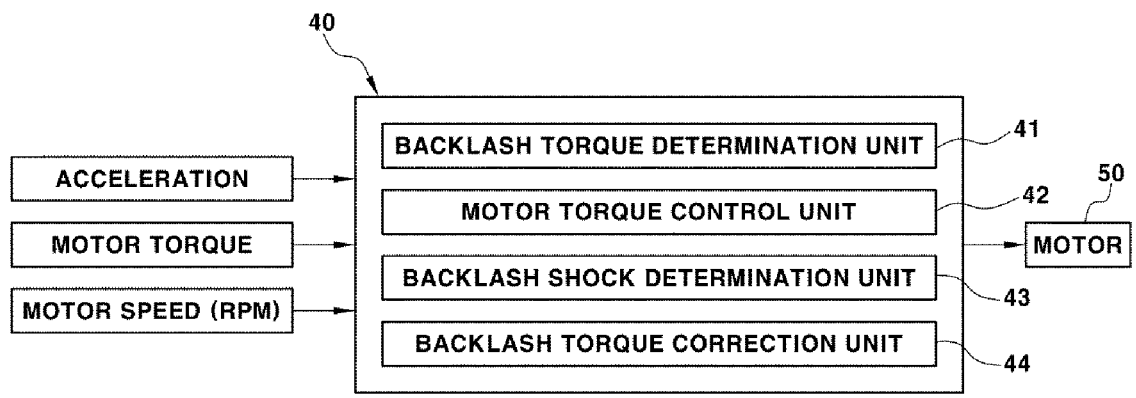
FIG. 1 is a control configuration diagram showing a configuration of a system for reducing the acceleration shock of an electric motor vehicle according to the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in unit by the particular intended application and use environment. In the drawings, reference numbers refer to the same or equivalent units of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings.

Figure 2:
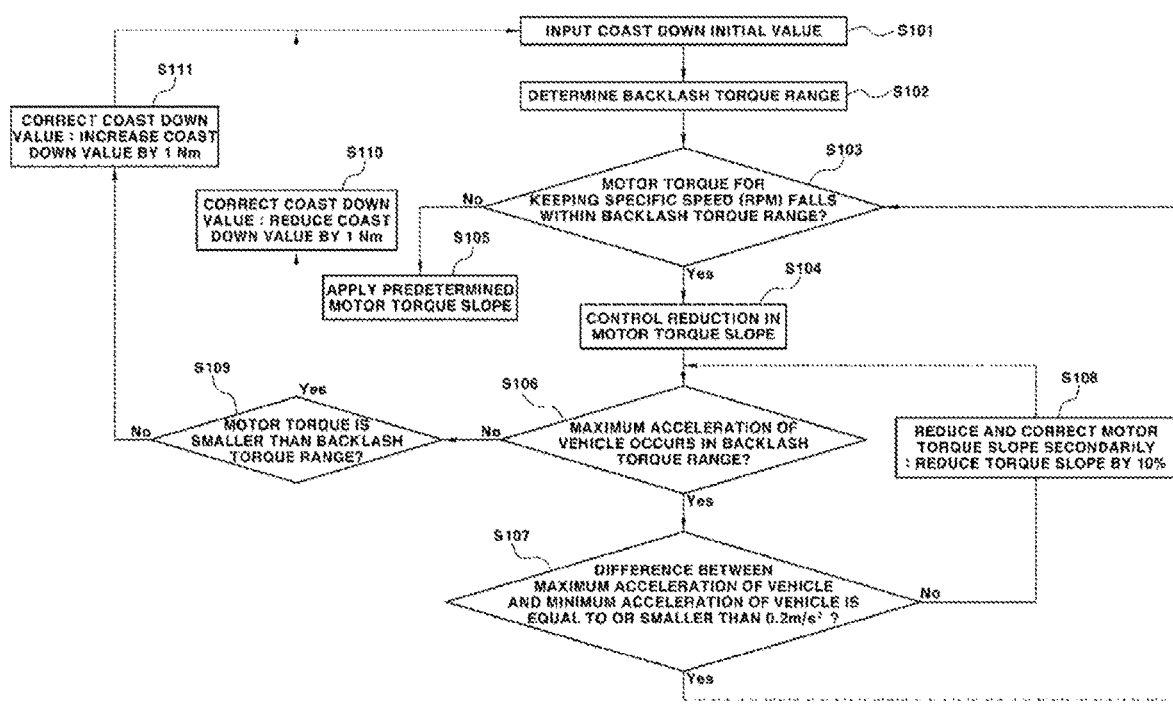
FIG. 2 is a flowchart showing a reduction in the acceleration shock of the electric motor vehicle according to the present disclosure.

FIG. 1 is a control configuration diagram showing a configuration of a system for reducing the acceleration shock of an electric motor vehicle according to the present disclosure, and FIG. 2 is a flowchart showing a reduction in the acceleration shock of the electric motor vehicle according to the present disclosure. As shown in FIG. 1, a system for reducing the acceleration shock of the present disclosure may include a motor controller 40 configured to execute the driving of a motor 50 for operating an electric motor vehicle, and the motor controller 40 uses vehicle acceleration, current motor torque, motor speed (RPM), etc. as the information for acceleration shock reduction.

For example, the motor controller 40 may be configured to execute logic capable of reducing the shock due to backlash at the acceleration of a vehicle, using the information such as an acceleration value received as one of the information shared by various controller equipped in the vehicle via the controller area network (CAN) communication, current motor torque that is a torque instruction value of a hybrid controller that is an upper controller, and a motor speed (RPM) calculated by receiving analog information output from a resolver sensor mounted on the motor.

For this purpose, the motor controller 40 may include a backlash torque determination unit 41 configured to determine a backlash torque based on a coast down value, a motor torque controller 42 configured to correct the slope of the motor torque by determining whether current motor torque and a motor speed are within the backlash torque range determined in the backlash torque determination unit 41, a backlash shock determination unit 43 configured to determine whether the vehicle acceleration maximum value occurs within the backlash torque range determined in the backlash torque determination unit 41, and a backlash torque correction unit 44 configured to correct the coast down value when the vehicle acceleration maximum value is not within (e.g., is outside of or beyond) the backlash torque range.

As described above, a vehicle that travels using the electric motor as power, shock occurs upon acceleration of the vehicle due to the backlash occurring in the transition section between the regenerative braking and the acceleration. The backlash occurs on the connection portion between the motor and the speed reducer, the connection portion between the speed reducer and the drive shaft, the connection portion between the drive shaft and the wheel, etc., and becomes a total backlash by summing the backlash occurring at each connection portion.

The reference for determining the above total backlash maybe the vicinity where the acceleration of the actual vehicle is changed, and the coast down value according to the motor speed may become a reference for determining the total backlash. For reference, the electric motor vehicle uses a dynamo system for fuel economy test to measure the fuel economy, and the measured fuel economy may be used as reliable data as an authentication value.

In this fuel economy measurement test, the coast down value, which is the motor torque for maintaining a specific motor speed (vehicle speed) and becomes a transition point of vehicle acceleration, is used, and the vehicle may be decelerated when the motor torque is less than the coast down value at a specific speed of the motor, and the vehicle may be accelerated when the motor torque is greater than the coast down value. Therefore, the backlash torque determination unit 41 of the present disclosure may use the coast down value defined by the motor torque for maintaining the specific vehicle speed as a reference value for determining the backlash torque.

More specifically, considering that the backlash occurs around 0 Nm of the motor torque but the backlash torque is changed as the motor speed is increased, the backlash torque determination unit 41 of the present disclosure may be configured to determine the backlash torque using the coast down value as the reference value at which the backlash torque is changed. For this purpose, when a coast down initial value is input to the motor controller 40S101, the backlash torque determination unit 41 may be configured to determine a backlash torque range based on the coast down initial value S102.

Figure 3:
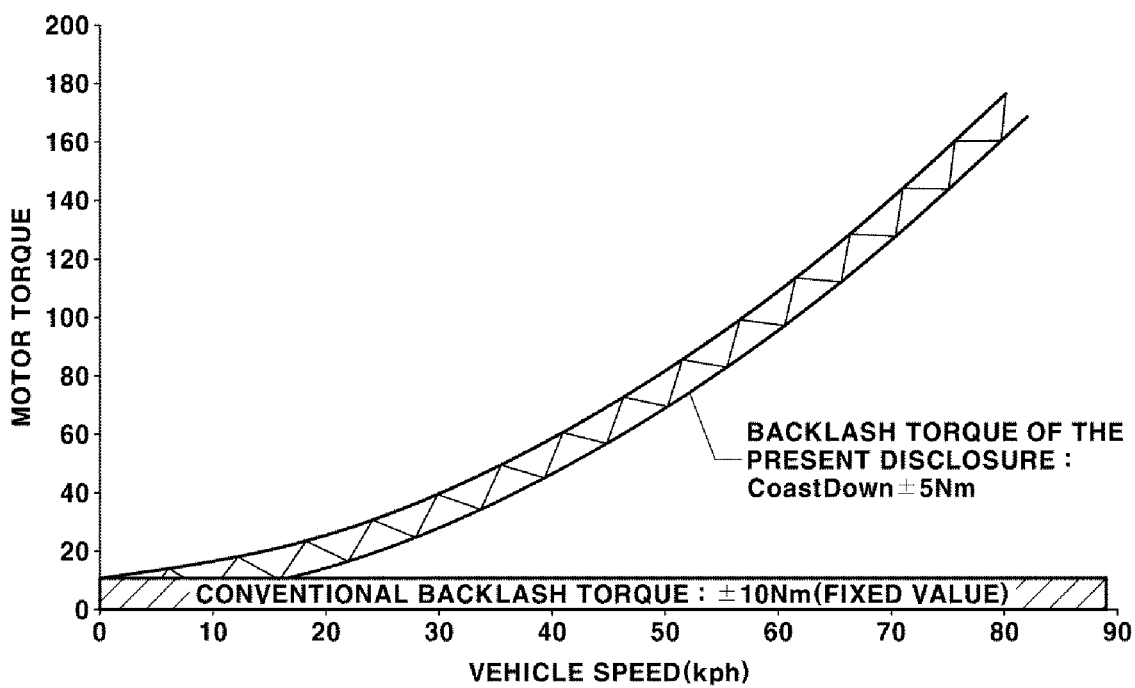
FIG. 3 is a graph comparing a backlash torque range according to the present disclosure with a backlash torque range according to a conventional method.

For example, the backlash torque determination unit 41 may be configured to determine ±5 Nm of the coast down value for maintaining the specific motor speed as the backlash torque range. In particular, as shown in FIG. 3, a method for determining the backlash torque in the range of ±10 Nm to the motor torque has been conventionally adopted without considering the motor speed, when determining the backlash torque, but the present disclosure may determine the ±5 Nm range of the coast down value for maintaining the specific motor speed as the backlash torque range, thereby changing the backlash torque range through the learning process that corrects the coast down value according to the vehicle weight and the traveling pattern, etc. including the vehicle model.

Subsequently, the motor torque controller 42 may be configured to determine whether the current motor torque for maintaining the motor RPM falls within the backlash torque determined in the S102, based on the current motor torque and the motor speed RPM S103. As the determination result in the S103, when the current motor torque for maintaining the motor RPM falls within the backlash torque range determined in the S102, the motor torque controller 42 may be configured to further reduce the slope of the motor torque applied to the motor for reducing the shock at the start-up of the vehicle than a predetermined slope S104.

For example, the motor torque controller 42 may be configured to further reduce the motor torque slope by about 50% more than the predetermined slope for reducing the shock at the start-up of the vehicle, thereby reducing the shock due to the backlash at the acceleration (start-up) of the vehicle as the slope of current motor torque becomes smooth within the backlash torque range. Conversely, as the determination result in the S103, when the current motor torque for maintaining the motor RPM is outside of the backlash torque range determined in the S102, the motor torque controller 42 may be configured to determine that the backlash is at an insignificant level to apply the motor torque using the predetermined motor torque slope S105.

Further, the backlash shock determination unit 43 may be configured to determine whether the maximum (MAX) acceleration of the vehicle has occurred within the backlash torque range determined in the S102 based on the vehicle acceleration information S106. In other words, the backlash shock determination unit 43 may be configured to determine whether the maximum (MAX) acceleration of the vehicle has occurred due to the motor torque falling within the backlash torque range determined in the S102.

As the determination result in the S106, in response to determining that the maximum (MAX) acceleration of the vehicle has occurred in the backlash torque range determined in the S102, the shock may be reduced at the start-up due to the control of reducing the slope of the motor torque performed in the S104 when the acceleration increases at the start-up of the vehicle.

In addition, the backlash shock determination unit 43 may be configured to confirm whether the difference between the maximum (MAX) acceleration and the minimum (MIN) acceleration of the vehicle is equal to or less than a threshold (e.g., about $0.2 \text{ m/s}^2$) S107. When the difference between the maximum (MAX) acceleration and the minimum (MIN) acceleration of the vehicle is equal to or less than the threshold, the shock at the start-up may be reduced due to the reduction of the slope of the motor torque performed in the S104, and as the subsequent steps, the S103 to S107 may be repeated.

Conversely, when the difference between the maximum (MAX) acceleration and the minimum (MIN) acceleration of the vehicle is greater than the threshold, the backlash shock determination unit 43 may be configured to execute the correction of further reducing the slope of the motor torque secondarily than the reduction value of the slope of the motor torque performed in the S104 (e.g., further reducing the slope of the motor torque by about 10%) S108. Therefore, when the difference between the maximum (MAX) acceleration and the minimum (MIN) acceleration of the vehicle is greater than the threshold, the slope of the motor torque maybe corrected more smoothly, thereby sufficiently reducing the shock due to the backlash at the start-up of the vehicle.

Meanwhile, as the determination result in the S106, when the maximum (MAX) acceleration of the vehicle does not occur within the backlash torque range determined in the S102, that is, when the maximum (MAX) acceleration of the vehicle occurs by the motor torque that is outside of the backlash torque range determined in the S102, the backlash torque correction unit 44 may be configured to determine whether the motor torque that is outside of the backlash torque range is greater than or less than the backlash torque range S109.

Particularly, the reason for determining whether the motor torque that is outside of the backlash torque range is greater than or less than the backlash torque range is for correcting the coast down value for determining the backlash torque. Therefore, when the motor torque that is outside of the backlash torque range is less than the lower limit value of the backlash torque range, the backlash torque correction unit 44 may be configured to reduce (e.g., a reduction in about 1 Nm) and correct the coast down value S110. When the motor torque that is outside of the backlash torque range is greater than the upper limit value of the backlash torque range, the backlash torque correction unit 44 may be configured to increase (e.g., an increase in about 1 Nm) and correct the coast down value S111.

As described above, it may be possible to correct the coast down value for determining the backlash torque, thereby again determining the backlash torque range in the S102, and causing the maximum (MAX) acceleration to occur within the again determined backlash torque range, and as a result, reducing the shock at the start-up according to the vehicle acceleration due to the reduction of the slope of the motor torque in the again determined backlash torque range.

As described above, although the exemplary embodiments of the present disclosure have been described in detail, the claims of the present disclosure is not limited to the above-described exemplary embodiments, and various modifications and improvements by those skilled in the art using the basic concept of the present disclosure defined in the appended claims can also be included the claims of the present disclosure.

What is claimed is:

1. A system for reducing the acceleration shock of an electric motor vehicle, comprising:
   a motor controller configured to operate the motor driving the electric motor vehicle, and perform shock reduction logic due to backlash at the acceleration using vehicle acceleration, motor torque, and motor speed information,
   wherein the motor controller includes:
   a backlash torque determination unit configured to determine a backlash torque range based on a coast down value;
   a motor torque controller configured to correct the slope of the motor torque by determining whether current motor torque and motor revolutions per minute (RPM) fall within the backlash torque range determined by the backlash torque determination unit; and
   a backlash shock determination unit configured to determine whether the maximum value of the vehicle acceleration occurs within the backlash torque range determined by the backlash torque determination unit.

2. The system for reducing the acceleration shock of the electric motor vehicle of claim 1, wherein the motor controller further includes a backlash torque correction unit configured to correct the coast down value when the maximum value of the vehicle acceleration is outside of the determined backlash torque range.

3. The system for reducing the acceleration shock of the electric motor vehicle of claim 2, wherein the backlash torque correction unit is configured to:
   Determine whether the motor torque that is outside of the backlash torque range is greater than or less than the backlash torque range;

reduce and correct the coast down value when the motor torque that is outside of the backlash torque range is less than the lower limit value of the backlash torque range; and increase and correct the coast down value when the motor torque that is outside of the backlash torque range is greater than the upper limit value of the backlash torque range.

4. The system for reducing the acceleration shock of the electric motor vehicle of claim 1, wherein the backlash torque determination unit is configured to determine the backlash torque range based on the coast down value defined as the motor torque for maintaining a specific motor speed.

5. The system for reducing the acceleration shock of the electric motor vehicle of claim 1, wherein the motor torque controller is configured to determine whether current motor torque for maintaining the motor speed falls within the determined backlash torque range, based on the current motor torque and the motor speed.

6. The system for reducing the acceleration shock of the electric motor vehicle of claim 5, wherein the motor torque controller is configured to reduce the slope of the motor torque applied to the motor more than a predetermined slope, when the current motor torque for maintaining the motor speed falls within the determined backlash torque range.

7. The system for reducing the acceleration shock of the electric motor vehicle of claim 5, wherein the motor torque controller is configured to apply the slope of the motor torque applied to the motor at a predetermined motor torque slope, when the current motor torque for maintaining the motor speed is outside of the determined backlash torque range.

8. The system for reducing the acceleration shock of the electric motor vehicle of claim 1, wherein the backlash shock determination unit is configured to determine whether the maximum (MAX) acceleration of the vehicle has occurred in the determined backlash torque range by receiving the vehicle acceleration information.

9. The system for reducing the acceleration shock of the electric motor vehicle of claim 8, wherein the backlash shock determination unit is configured to perform the correction of further reducing the motor torque slope secondarily, when the difference between the maximum (MAX) acceleration and the minimum (MIN) acceleration of the vehicle is greater than a threshold.

10. A method for reducing the acceleration shock of an electric motor vehicle, comprising:

determining, by a controller, a backlash torque range based on a coast down value defined as the motor torque for maintaining a specific vehicle speed;

correcting, by the controller, a slope of the motor torque by determining whether current motor torque and motor speed fall within the determined backlash torque range; and determining, by the controller, whether the maximum value of the vehicle acceleration occurs in the determined backlash torque range.

11. The method for reducing the acceleration shock of the electric motor vehicle of claim 10, further comprising:
correcting, by the controller, the coast down value, when the maximum value of the vehicle acceleration is outside of the determined backlash torque range.

12. The method for reducing the acceleration shock of the electric motor vehicle of claim 11, wherein correcting the coast down value includes:

determining, by the controller, whether the motor torque that is outside of the backlash torque range is greater than or less than the backlash torque range;

reducing and correcting, by the controller, the coast down value when the motor torque that is outside of the backlash torque range is less than the lower limit value of the backlash torque range; and increasing and correcting, by the controller, the coast down value when the motor torque that is outside of the backlash torque range is greater than the upper limit value of the backlash torque range.

13. The method for reducing the acceleration shock of the electric motor vehicle of claim 10, further comprising:
reducing, by the controller, the slope of the motor torque applied to a motor more than a predetermined slope, when current motor torque and motor speed fall within the determined backlash torque range.

14. The method for reducing the acceleration shock of the electric motor vehicle of claim 10, further comprising:
applying, by the controller, the motor torque at a predetermined motor torque slope, when the current motor torque and the motor speed are outside of the determined backlash torque range.

15. The method for reducing the acceleration shock of the electric motor vehicle of claim 10, further comprising:
further reducing, by the controller, the slope of the motor torque secondarily, when the difference between the maximum (MAX) acceleration and the minimum (MIN) acceleration of the vehicle is greater than a threshold.

* * * * *